(12) United States Patent
Sitaraman et al.

(10) Patent No.: US 11,032,196 B2
(45) Date of Patent: *Jun. 8, 2021

(54) PER PATH AND PER LINK TRAFFIC ACCOUNTING

(71) Applicant: Juniper Networks, Inc., Sunnyvale, CA (US)

(72) Inventors: Harish Sitaraman, Cupertino, CA (US); Zhifang Zeng, Fremont, CA (US); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,408

(22) Filed: Jul. 31, 2020

(65) Prior Publication Data

US 2021/0014163 A1 Jan. 14, 2021

Related U.S. Application Data

(63) Continuation of application No. 15/612,812, filed on Jun. 2, 2017, now Pat. No. 10,742,548.

(51) Int. Cl.
*H04L 12/741* (2013.01)
*H04L 29/06* (2006.01)
*H04L 12/26* (2006.01)

(52) U.S. Cl.
CPC .............. *H04L 45/74* (2013.01); *H04L 43/12* (2013.01); *H04L 69/22* (2013.01)

(58) Field of Classification Search
CPC .......... H04L 45/74; H04L 43/12; H04L 69/22
See application file for complete search history.

(56) References Cited

U.S. PATENT DOCUMENTS

| 8,009,582 | B2 | 8/2011 | Mihaly et al. |
| 8,085,792 | B1 | 12/2011 | Aly |
| 9,088,507 | B1 | 7/2015 | Sukonik et al. |
| 9,871,748 | B2 | 1/2018 | Gosselin et al. |
| 10,742,548 | B1 | 8/2020 | Sitaraman |
| 2005/0063385 | A1 | 3/2005 | Wybenga et al. |
| 2008/0144523 | A1 | 6/2008 | Nishi et al. |

(Continued)

OTHER PUBLICATIONS

Filsfils C., et al., "Segment Routing Architecture," https://tools.Ieft.org/html/draft-Ieft-spring-segment-routing, Feb. 16, 2017, 28 pages.

(Continued)

*Primary Examiner* — Habte Mered
(74) *Attorney, Agent, or Firm* — Harrity & Harrity, LLP (57) ABSTRACT

A first device may receive a packet that includes information identifying a path through a network. The first device may configure a header of the packet to include a first set of identifiers that identifies the path and the first device via which the packet was received. The first device may configure the header of the packet to include a second set of identifiers that identifies a set of devices associated with the path. The set of devices may be associated with providing the packet via a network. The first device may determine whether a counter associated with the first set of identifiers has been initialized. The first device may modify a value of the counter to record a metric. The first device may provide the packet to a second device. The first device may perform an action related to the packet or based on the value of the counter.

20 Claims, 7 Drawing Sheets

(56) References Cited

U.S. PATENT DOCUMENTS

| | | |
|---|---|---|
| 2013/0107711 A1 | 5/2013 | Kessler et al. |
| 2016/0014029 A1 | 1/2016 | Yuan et al. |
| 2016/0248623 A1 | 8/2016 | Matsuura |
| 2017/0034009 A1 | 2/2017 | Hongo et al. |
| 2017/0064717 A1 | 3/2017 | Filsfils et al. |
| 2017/0118108 A1 | 4/2017 | Avci et al. |
| 2018/0019944 A1 | 1/2018 | Peng et al. |
| 2018/0034727 A1 | 2/2018 | Nainar et al. |
| 2018/0219783 A1 | 8/2018 | Pfister et al. |

OTHER PUBLICATIONS

Kini S., et al., "Entropy Labels for Source Routed Tunnels with Label Stacks," https://tools.Ieft.org/html/draft-Ieft-mpls-spring-entropy-table-04, Jul. 8, 2016, 12 pages.

Previdi S., et al., "1Pv6 Segment Routing Header (SRH)," https://tools.Ieft.org/html/draft-Ieft-6man-segment-routing-header-05, Feb. 1, 2017, 28 pages.

PER PATH AND PER LINK TRAFFIC ACCOUNTING

RELATED APPLICATION

This application is a continuation of U.S. patent application Ser. No. 15/612,812, filed Jun. 2, 2017 (now U.S. Pat. No. 10,742,548), which is incorporated herein by reference.

BACKGROUND

Segment routing may include the use of a source routing paradigm. In segment routing, a node (e.g., a network device) may provide a packet using an ordered list of instructions, called segments. A segment may represent any instruction, topological or service-based, related to providing a packet. A segment may be local to a node or global within a segment routing domain.

SUMMARY

According to some possible implementations, a first device may include one or more processors to receive a packet that includes information identifying a path through a network. The packet may be received from an external network and the first device may be a point of ingress for the network. The one or more processors may configure a header of the packet to include a first set of identifiers that identifies the path and the first device via which the packet was received. The one or more processors may configure the header of the packet to include a second set of identifiers that identifies a set of devices associated with the path. The set of devices may be associated with providing the packet via the network. The one or more processors may determine whether a counter associated with the first set of identifiers has been initialized. The counter may be used to record a metric associated with the packet. The one or more processors may modify a value of the counter to record the metric associated with the packet. The one or more processors may provide the packet to a second device. The one or more processors may perform an action related to the packet or based on the value of the counter.

According to some possible implementations, a non-transitory computer-readable medium may store one or more instructions that, when executed by one or more processors of a first network device, cause the one or more processors to receive one or more packets that include information identifying one or more paths through a core network. The one or more packets may be received from an external network or a second network device. The first network device may be associated with the core network. The one or more instructions, when executed by the one or more processors, may cause the one or more processors to configure one or more headers of the one or more packets to include one or more first sets of identifiers that identify the one or more paths and the first network device. The one or more instructions, when executed by the one or more processors, may cause the one or more processors to configure the one or more headers of the one or more packets to include one or more second sets of identifiers that identify one or more sets of devices associated with the one or more paths. The one or more sets of devices may include one or more ingress network devices, one or more core network devices, or one or more egress network devices. The one or more instructions, when executed by the one or more processors, may cause the one or more processors to determine whether one or more counters associated with the one or more first sets of identifiers have been initialized. The one or more counters may be used to record one or more metrics associated with the one or more packets. The one or more instructions, when cured by the one or more processors, may cause the one or more processors to modify one or more values of the one or more counters to record the one or more metrics associated with the one or more packets. The one or more instructions, when executed by the one or more processors, may cause the one or more processors to perform one or more actions related to the one or more packets or lased on the one or more values of the one or more counters.

According to some possible implementations, a method may include receiving, by a first device, a packet that includes information identifying a path through a first network. The packet may originate from a second network. The method may include configuring, by the first device, a header of the packet to include a first set of identifiers that identifies the path and the first device. The first set of identifiers may be based on the information identifying the path through the first network included in the packet. The method may include configuring, by the first device, the header of the packet to include a second set of identifiers that identifies a set of devices associated with the path. The set of devices may include the first device, or one or more second devices associated with the first network. The method may include determining, by the first device, whether a counter associated with the first set of identifiers has been initialized. The counter may be used to record a metric relating to packets to be transmitted via the path. The method may include modifying, by the first device, a value of the counter to record the metric. The method may include providing, by the first device, the packet to a second device of the one or more second devices.

DETAILED DESCRIPTION

The following detailed description of example implementations refers to the accompanying drawings. The same reference numbers in different drawings may identify the same or similar elements.

In segment routing, network devices may use label switched paths (LSPs) to exchange packets. In some cases, a link (e.g., a connection) between two network devices may be associated with multiple label switched paths. The LSPs may lack per-LSP labels to distinguish traffic on a particular LSP from traffic on another LSP when both LSPs are associated with the same link. In addition, the network devices may be identified by an identifier (e.g., a device identifier, a segment identifier, etc.) that is reused for multiple LSPs, which increases a difficulty of accounting for traffic on a per LSP basis using the identifier. The network devices may lack a technique for recording packet transfer metrics (e.g., a quantity of packets) that are exchanged via each LSP of a link between two network devices. In other words, the network devices may lack a technique for per LSP and per link traffic accounting.

Some implementations, described herein, provide a network device that is capable of configuring a header of a packet with a set of identifiers that identifies a path via which the packet is to be provided and an ingress network device that received the packet. In this way, the network device may configure a set of identifiers, and push the set of identifiers to a packet, that permit another network device to determine a particular path, of multiple paths associated with a link between two network devices, via which a packet was received. This permits the network device or another network device to record packet transfer metrics for each path of a link, thereby facilitating improved traffic management, improved analytics, and/or the like. This improves communications between two network devices by facilitating reduction or elimination of network congestion on a particular path. Further, this conserves network resources, such as bandwidth, between two network devices by facilitating the offloading of traffic on a link between the two network devices to another link. Further, this provides a forwarding plane solution that does not require a control plane to provide information to the forwarding plane to account for traffic on a per path and per link basis.

FIGS. 1A-1D are diagrams of an overview of an example implementation 100 described herein. As shown, implementation 100 may include an ingress network device, a core network device, and an egress network device. Assume, for example, that the ingress network device, the core network device, and the egress network device are associated with a core network, where the ingress network device functions as a point of ingress for traffic into the core network, the core network device does not have external connectivity, and the egress network device functions as a point of egress for traffic from the core network. Further assume, for example, that the ingress network device, the core network device, and the egress network device implement segment routing and that a first link between the ingress network device and the core network device and a second link between the core network device and the egress network device are associated with multiple paths (e.g., LSPs).

Figure 1A:
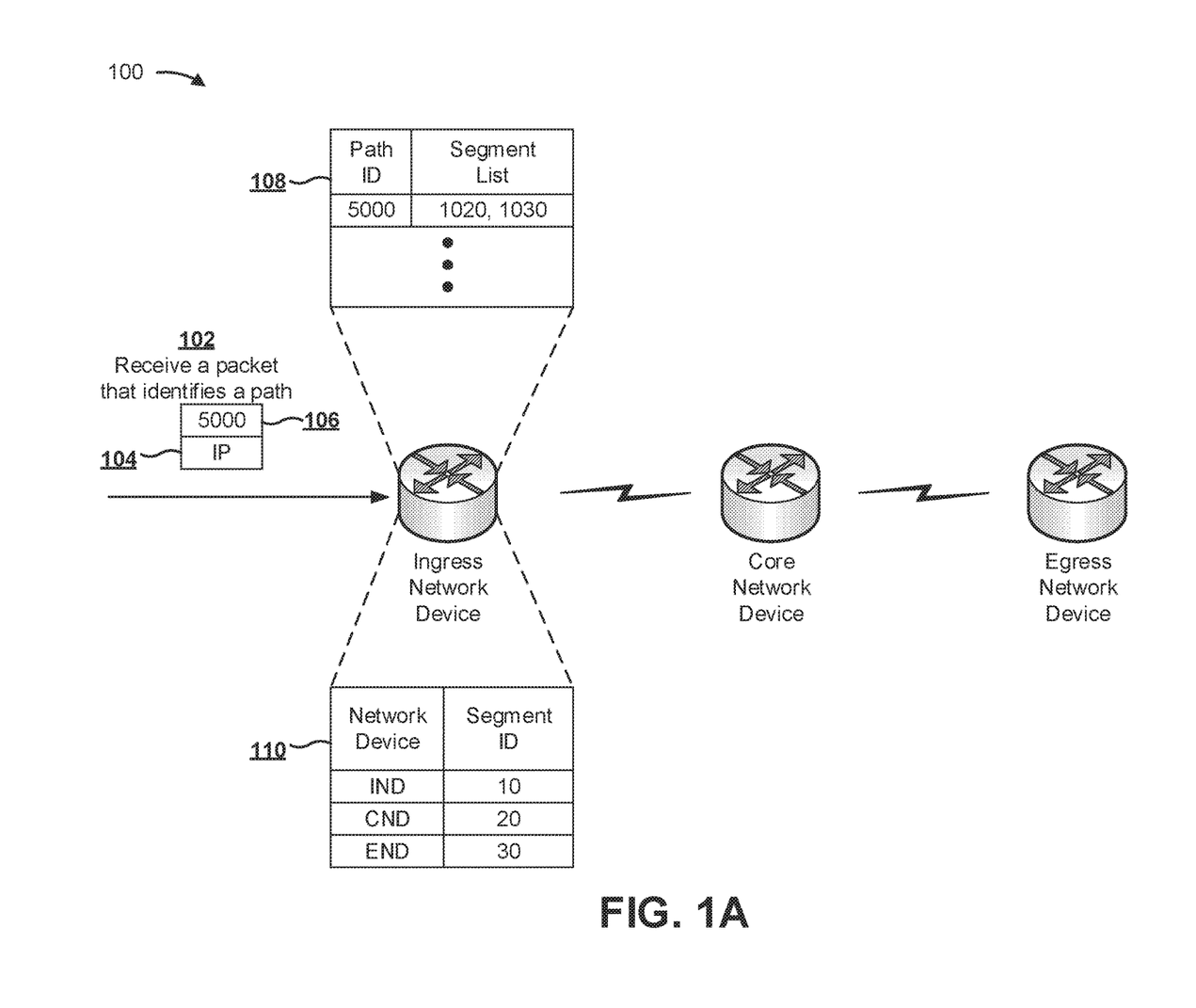
FIGS. 1A-1D are diagrams of an overview of an example implementation described herein.

As shown in FIG. 1A, and by reference number 102, the ingress network device may receive a packet that identifies a path (e.g., an LSP). For example, the ingress network device may receive the packet from an external network. As shown by reference number 104, the packet may include an Internet protocol (IP) packet. In addition, as shown by reference number 106, the packet may include an identifier (e.g., a label in a header of the packet) that identifies a path via the core network that the packet is intended to travel (e.g., shown as "5000"). The ingress network device may process the packet upon receiving the packet to determine the path through the core network via which the packet is intended to travel. For example, the ingress network device may determine the path using the identifier included in the packet (e.g., the identifier "5000") and other information that the ingress network device is storing.

For example, as shown by reference number 108, the ingress network device may use a data structure that includes a set of identifiers that identify a set of paths (e.g., shown as "Path ID") and a corresponding segment list that identifies segments of the path. For example, the path identified by the identifier "5000" may be associated with two identifiers that identify two nodes of the path (e.g., referred to herein as a node identifier): "1020" and "1030."

A node identifier may include a combination of identifiers that identify network devices associated with the path, as described below.

The ingress network device may determine devices to which the packet is to be provided based on the segment list associated with the identifier "5000" that identifies a path example, as shown by reference number 110, the ingress network device may use a data structure that includes information identifying devices in the core network (e.g., shown as "Network Device") and corresponding segment identifiers that are used to form a node identifier (e.g., shown as "Segment ID"). For example, ingress network device may determine that node identifier "1020" identifies nodes of a path segment between the ingress network device (e.g., identified by "IND" and segment identifier "10") and the core network device (e.g., identified by "CND" and segment identifier "20"). Similarly, ingress network device may determine that node identifier 1030 identifies a node of a path segment between the ingress network device and egress network device (e.g., indicating that the core network device is to provide a packet from the ingress network device to the egress network device).

Figure 1B:
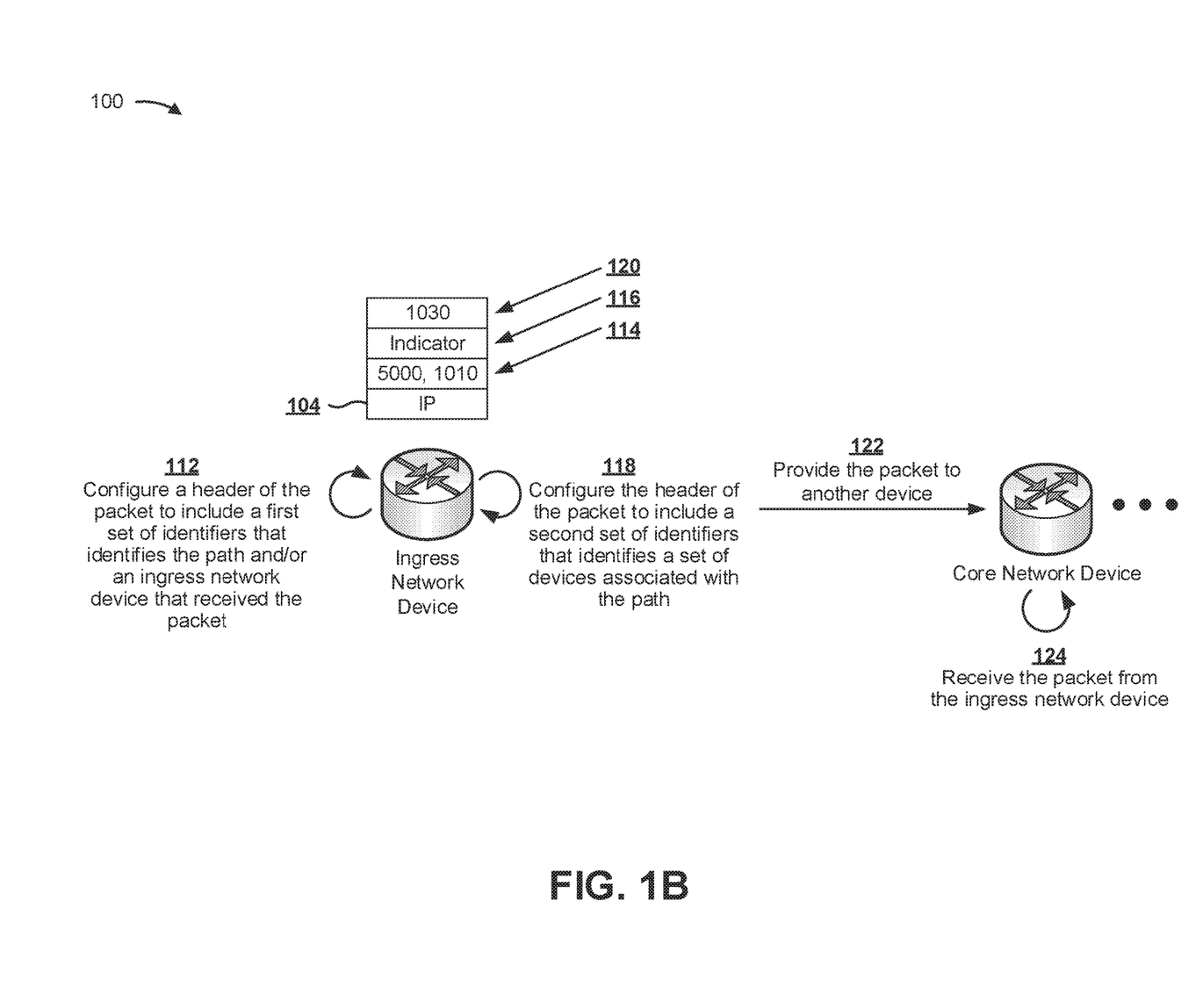

As shown in FIG. 1B, and by reference number 112, the ingress network device may configure a header of the packet to include a first set of identifiers that identifies the path through the core network and/or an ingress network device associated with the core network that received the packet (e.g., a forwarding plane of the ingress network device may configure the header after receiving the first set of identifiers from a control plane or controller associated with the ingress network device). For example, as shown by reference number 114, the ingress network device may configure a header of the packet to include the path identifier "5000," which identifies the path the packet is intended to be sent, and the node identifier "1010," which identifies the ingress network device as the ingress network device that received the packet. As shown by reference number 116, the ingress network device may further configure the header to include information identifying the presence of the first set of identifiers (e.g., shown as "Indicator").

This permits other devices to identify the first set of identifiers. In addition, the information that identifies the presence of the first set of identifiers may indicate that the first set of identifiers is to be used to account for traffic and not for another purpose, such as traffic forwarding. In some implementations, the first set of identifiers may be popped, pushed, swapped, and/or the like in a data structure or label stack associated with a packet. In this way, the ingress network device may configure a first set of identifiers that permits identification of a particular path via which a packet is received and a particular ingress network device, associated with the path, that received the packet (e.g., when a particular link is associated with multiple paths), thereby permitting recording of packet metrics on a per path and per link basis.

When configuring the header of the packet, the ingress network device may configure the first set of identifiers and the information identifying the presence of the first set of identifiers in a stack of identifiers based on a readable label depth capability (RLDC) of other devices in the core network. This ensures that other devices in the core network can process the first set of identifiers and the information identifying the presence of the first set of identifiers, and account for the packet using the first set of identifiers.

As shown by reference number 118, the ingress network device may configure the header of the packet to include a second set of identifiers that identifies a set of devices associated with the path. For example, as shown by reference number 120, the ingress network device may configure the header of the packet to include a set of node identifiers associated with the path. The set of node identifiers may identify devices of the core network via which the packet is to be forwarded.

As shown by reference number 122, the ingress network device may provide the packet to another device. For example, the ingress network device may provide the packet to the core network device (e.g., based on the segment list including the node identifier "1020" associated with path identifier "5000," as described above with respect to reference number 108 in FIG. 1A). As shown by reference number 124, the core network device may receive the packet from the ingress network device (e.g., via an ingress interface associated with the core network device).

Figure 1C:
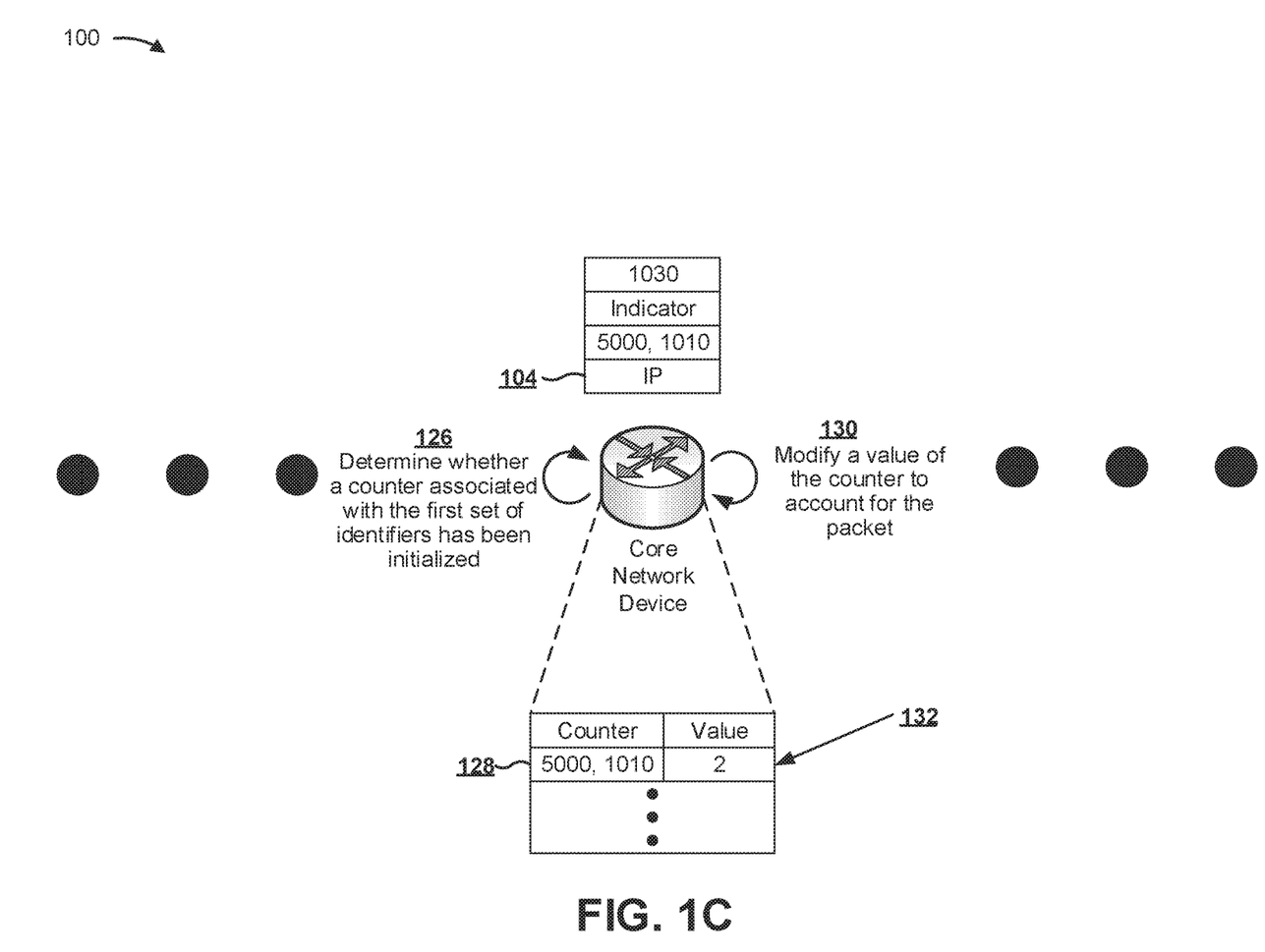

As shown in FIG. 1C, and by reference number 126, the core network device may determine whether a counter associated with the first set of identifiers has been initialized (e.g., a forwarding plane of the core network device may determine whether a counter has been initialized). For example, as shown by reference number 128, the core network device may use information identifying various counters that have been initialized for various first sets of identifiers and corresponding values of the counters. In this case, the core network device may determine that the core network device has previously initialized a counter for the first set of identifiers. As shown by reference number 130, the core network device may modify a value of the counter to account for the packet. As shown by reference number 132, the core network device may iterate a value of the counter by one to account for the packet. For example, as shown, the core network device may iterate the value of the counter such that the counter has a value of 2.

Figure 1D:
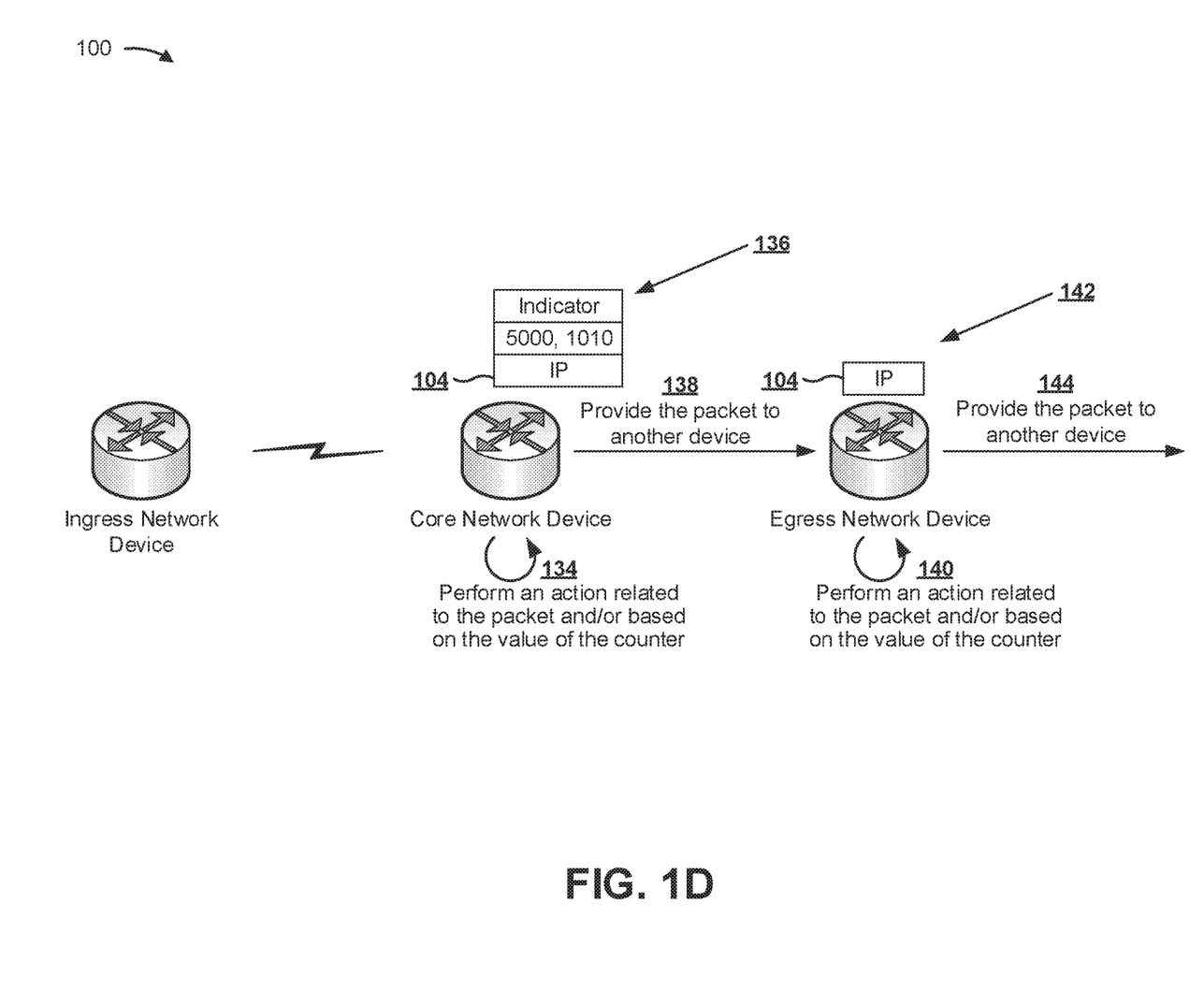

As shown in FIG. 1D, and by reference number 134, the core network device may perform an action related to the packet and/or based on the value of the counter. For example, the core network device may determine the next device to receive the packet (e.g., the egress network device) based on the node identifier "1030" that the ingress network device included in the second set of identifiers. Additionally, or alternatively, and as shown by reference number 136, the core network device may remove the node identifier "1030" from the header of the packet. Additionally, or alternatively, the core network device may iterate a value of a counter associated with the first set of identifiers based on receiving the packet, in a manner similar to that described above (e.g., using the first set of identifiers configured in the header of the packet). For example, a forwarding plane of the core network device may iterate a value of a counter after identifying the first set of identifiers. As shown by reference number 138, the core network device may provide the packet to another device (e.g., the egress network device).

As shown by reference number 140, the egress network device may perform an action related to the packet and/or based on the value of the counter. For example, as shown by reference number 142, the egress network device may remove the information indicating the presence of the first set of identifiers and may remove the first set of identifiers (e.g., based on the egress network device being a point of egress from the core network). Additionally, or alternatively, and as another example, the egress network device may perform an action similar to that described above with respect to the ingress network device and/or the core network device. As shown by reference number 144, the egress network device may provide the packet to another device. For example, by functioning as a point of egress for the core network, the egress network device may provide the packet to a device associated with an external network.

In some implementations, a device e.g., an external server device, not shown, the ingress network device, the core network device, and/or the egress network device) may receive information identifying a value of various counters, such as for aggregation and/or analysis. In some implementations, the device may determine a manner in which traffic is to be forwarded via a core network based on the value of the various counters and may provide a set of instructions that indicate the manner in which traffic is to be forwarded to the ingress network device, the core network device, and/or the egress network device. For example, the set of instructions may cause the ingress network device to re-route other packets based on an amount of traffic on path "5000."

In this way, a network device may configure a set of identifiers that permit another network device to determine a particular path, of multiple paths associated with a link between two network devices, via which a packet was received. This permits the network device or another network device to record packet transfer metrics for each path of a link, thereby facilitating improved traffic management, improved analytics, and/or the like. This improves communications between two network devices by facilitating reduction or elimination of network congestion on a particular path. Further, this conserves network resources, such as bandwidth, between two network devices by facilitating the offloading of traffic on a link between the two network devices to another link.

As indicated above, FIGS. 1A-1D are provided merely as an example. Other examples are possible and may differ from what was described with regard to FIGS. 1A-1D. Although particular implementations were described with respect to an ingress network device, a core network device, an egress network device, and/or a server device, the implementations described herein apply equally to the ingress network device, the core network device, the egress network device, and/or the server device. In other words, an ingress network device, a core network device, an egress network device, and/or a server device may be associated with any or all of the implementations described herein. In addition, although FIGS. 1A-1D show a single ingress network device, a single core network device, and a single egress network device, there may be hundreds, thousands, etc. of ingress network devices, core network devices, and/or egress network devices in one or more geographic locations.

Figure 2:
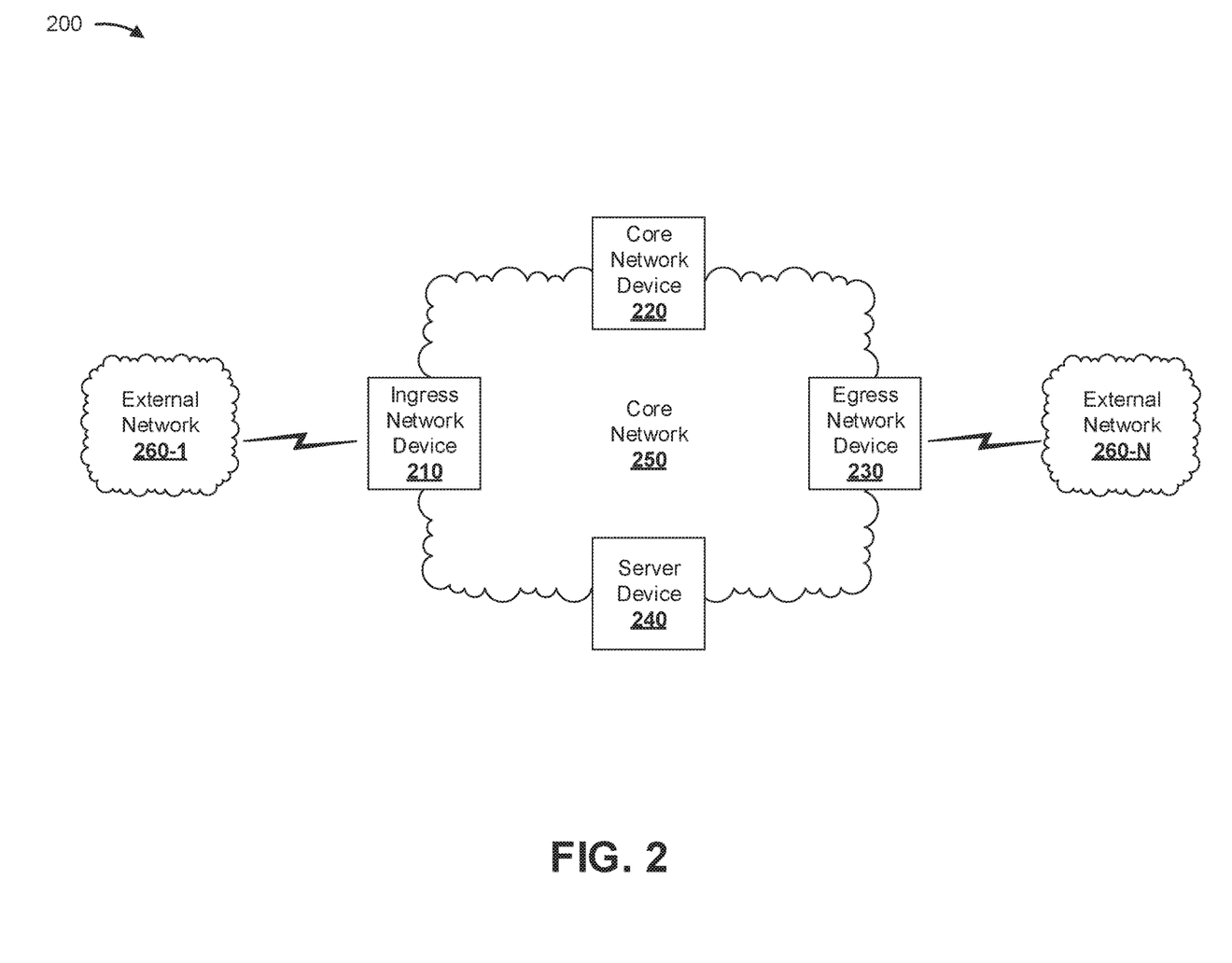
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include ingress network device 210, core network device 220, egress network device 230, server device 240, core network 250, and one or more external networks 260-1 through 260-N (N≥1) (hereinafter referred to collectively as "external networks 260," and individually as "external network 260"). Devices of environment 200 may interconnect via wired connections, wireless connections, or a combination of wired and wireless connections.

Ingress network device 210 includes one or more devices (e.g., one or more traffic transfer devices) capable of receiving, generating, storing, processing, and/or providing information related to per path and per link traffic accounting. For example, ingress network device 210 may include a modem, a firewall, a router, a gateway, a switch, a hub, a bridge, a reverse proxy, a server (e.g., a proxy server), a security device, an intrusion detection device, a load balancer, or a similar type of device. In some implementations, ingress network device 210 may be a physical device implemented within a housing, such as a chassis. In some implementations, ingress network device 210 may be a virtual device implemented by one or more computer devices of a cloud computing environment or a data center. In some implementations, ingress network device 210 may receive a packet (e.g., from external network 260 based on being located at an edge of core network 250), as described elsewhere herein. Additionally, or alternatively, ingress network device 210 may configure a header of the packet and may provide the packet to core network device 220, as described elsewhere herein. Although ingress network device 210 is described as being a point of ingress for a packet into core network 250, ingress network device 210 may function as core network device 220 and/or egress network device 230.

Core network device 220 includes one or more devices (e.g., one or more traffic transfer devices) capable of receiving, generating, storing, processing, and/or providing information related to per path and per link traffic accounting. For example, core network device 220 may include a modem, a firewall, a router, a gateway, a switch, a hub, a bridge, a reverse proxy, a server (e.g., a proxy server), a security device, an intrusion detection device, a load balancer, or a similar type of device. In some implementations, core network device 220 may be a physical device implemented within a housing, such as a chassis. In some implementations, core network device 220 may be a virtual device implemented by one or more computer devices of a cloud computing environment or a data center. In some implementations, core network device 220 may receive a packet (e.g., from ingress network device 210 based on being located at a core of core network 250), as described elsewhere herein. Additionally, or alternatively, core network device 220 may modify a header of the packet (e.g., as configured by ingress network device 210) and may provide the packet to egress network device 230, as described elsewhere herein. Although core network device 220 is described as receiving a packet from ingress network device 210 and providing the packet to egress network device 230, core network device 220 may function as ingress network device 210 and/or egress network device 230.

Egress network device 230 includes one or more devices (e.g., one or more traffic transfer devices) capable of receiving, generating, storing, processing, and/or providing information related to per path and per link traffic accounting. For example, egress network device 230 may include a modem, a firewall, a router, a gate, a switch, a hub, a bridge, a reverse proxy, a server (e.g., a proxy server), a security device, an intrusion detection device, a load balancer, or a similar type of device. In some implementations, egress network device 230 may be a physical device implemented within a housing, such as a chassis. In some implementations, egress network device 230 may be a virtual device implemented by one or more computer devices of a cloud computing environment or a data center. In some implementations, egress network device 230 may receive a packet (e.g., from core network device 220), as described elsewhere herein. Additionally, or alternatively, egress network device 230 may modify a header of the packet (e.g., as configured by ingress network device 210) and may provide the packet to external network 260 (e.g., based on being located on an edge of core network 250), as described elsewhere herein. Although egress network device 230 is described as being a point of egress for a packet out of core network 250, egress network device 230 may function as ingress network device 210 and/or core network device 220.

Server device 240 includes one or more devices capable of receiving, generating, storing, processing, and/or providing information associated with per path and per link traffic accounting. For example, server device 240 may include a server (e.g., a web server, a server in a multi-server data center, or the like), a data center (e.g., a multi-server micro data center), a workstation computer, a virtual machine (VM) provided in a cloud computing environment, or a similar type of device. In some implementations, server device 240 may record metrics associated with traffic provided and/or received via ingress network device 210, core network device 220, and/or egress network device 230, as described elsewhere herein. Additionally, or alternatively, server device 240 may perform an action based on recorded metrics, as described elsewhere herein.

Core network 250 includes one or more wired and/or wireless networks. For example, core network 250 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, core network 250 may be associated with ingress network device 210, core network device 220, egress network device 230, and/or server device 240, as described elsewhere herein.

External network 260 includes one or more wired and/or wireless networks. For example, core network 250 may include a cellular network (e.g., an LTE network, a CDMA network, a 3G network, a 4G network, a 5G network, or another type of cellular network), a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, external network 260 may exchange a packet with core network 250 (e.g., via ingress network device 210, core network device 220, and/or egress network device 230), as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200. Although FIG. 2 shows a single ingress network device 210, a single core network device 220, a single egress network device 230, and/or a single server device 240, environment 200 may include hundreds, thousands, etc. of ingress network devices 210, core network devices 220, egress network devices 230, and/or server devices 240 in one or more geographic locations.

Figure 3:
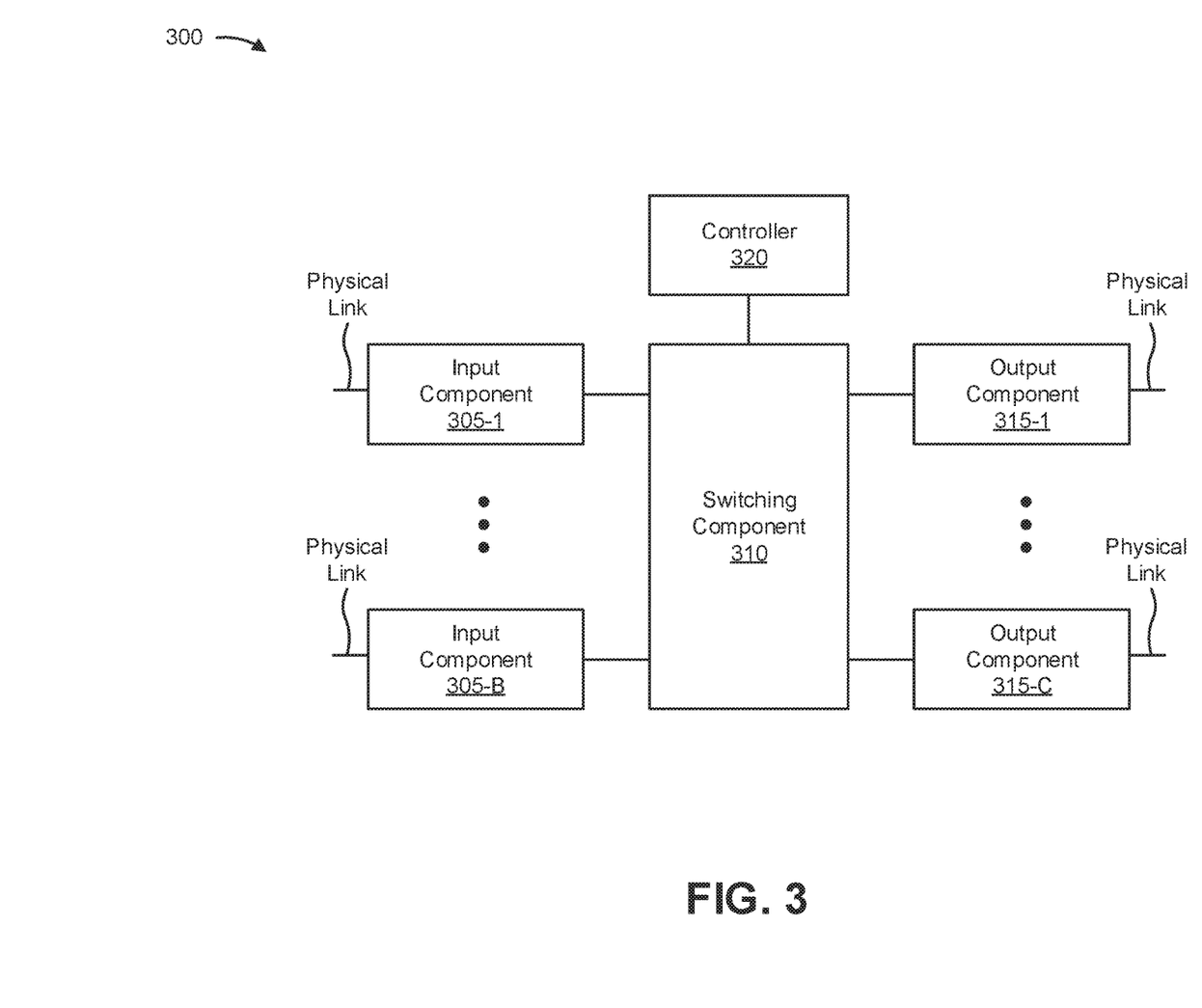
FIG. 3 is a diagram of example components of one or more devices of FIG. 2.

FIG. 3 is a diagram of example components of a device 300. Device 300 may correspond to ingress network device 210, core network device 220, egress network device 230, and/or server device 240. In some implementations, ingress network device 210, core network device 220, egress network device 230, and/or server device 240 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
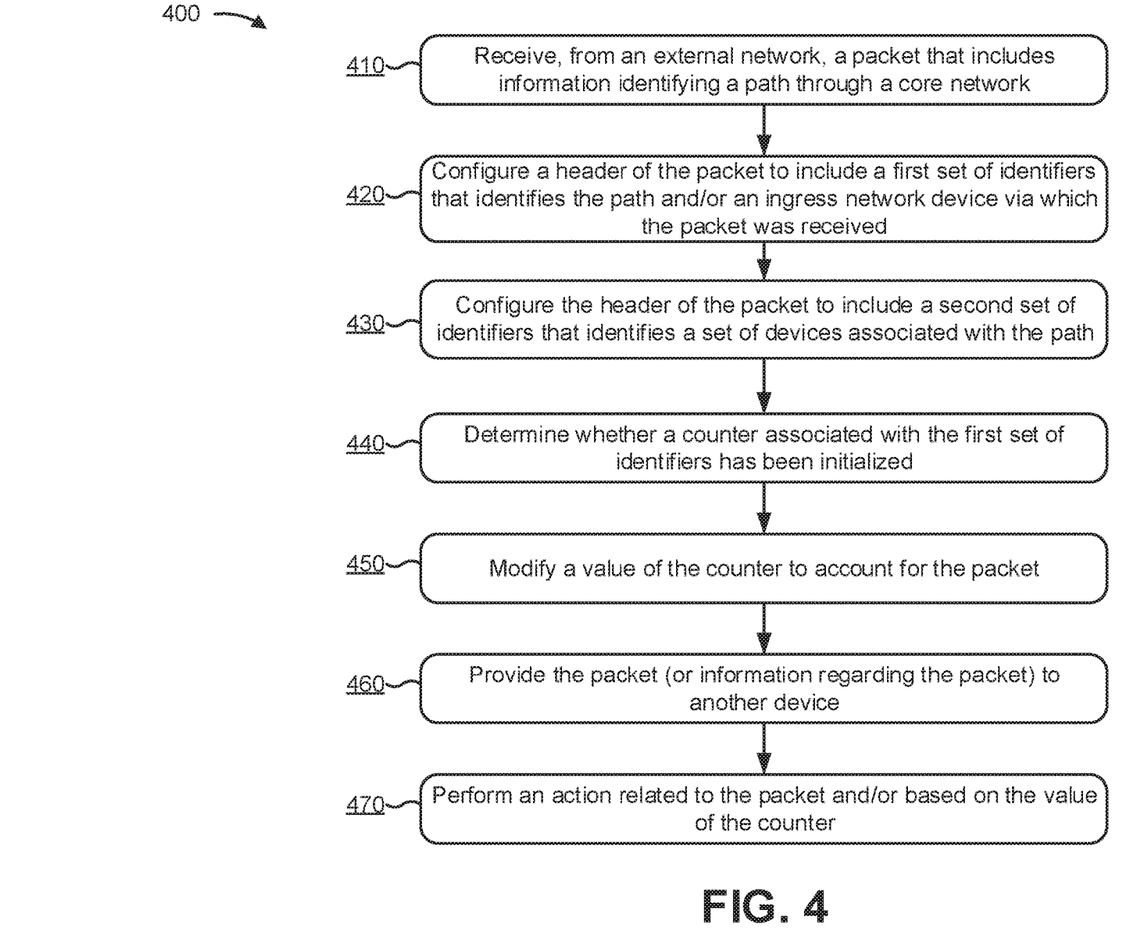
FIG. 4 is a flow chart of an example process for per path and per link traffic accounting.

FIG. 4 is a flow chart of an example process 400 for per path and per link traffic accounting. In some implementations, one or more process blocks of FIG. 4 may be performed by ingress network device 210. In some implementations, one or more process blocks of FIG. 4 may be performed by another device or a group of devices separate from or including ingress network device 210, such as core network device 220, egress network device 230, and server device 240.

As shown in FIG. 4, process 400 may include receiving, from an external network, a packet that includes information identifying a path through a core network (block 410). For example, ingress network device 210 may receive, from external network 260, a packet that includes information identifying a path through core network 250 (e.g., the packet may originate from external network 260). In some implementations, ingress network device 210 may receive the packet based on a device associated with external network 260 providing the packet, periodically, according to a schedule, based on requesting the packet, based on input from a user of ingress network device 210, and/or the like. In some implementations, ingress network device 210 may receive the packet from a device associated with external network 260 (e.g., egress network device 230 associated with external network 260, an endpoint device associated with external network 260, a host device associated with external network 260, etc.).

In some implementations, a packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via core network 250 and/or external network 260. For example, a packet may include an IP packet. In some implementations, the term traffic may refer to a set of packets.

In some implementations, a packet may include information that identifies a path through core network 250 via which the packet is intended to be provided. For example, a header of a packet may include a binding segment identifier (binding SID), or another type of identifier, that identifies a path via core network 250. In some implementations, the packet may include the information identifying the path in the form of a label in the header of the packet. In some implementations, a path may include a route via core network 250 via which a packet is intended to be provided, a set of devices (e.g., a set of ingress network devices 210, core network devices 220, and/or egress network devices 230) via which the packet is intended to be provided, a set of segments that form a path (e.g., in a segment routing context), a set of label switched paths (LSPs), a set of links between a set of devices via which the packet is intended to be provided, and/or the like.

In some implementations, ingress network device 210 may determine a path using the information included in the packet. For example, ingress network device 210 may obtain the information identifying the path from a header of the packet to determine the path. In some implementations, when determining the path, ingress network device 210 may perform a look up of the information identifying the path in a data structure. For example, ingress network device 210 may perform a look up of a binding SID to identify a set of nodes via which the packet is to be provided (e.g., a node list). In this way, ingress network device 210 may determine a path via core network 250 using information included in the packet that identifies the path.

In this way, ingress network device 210 may receive, from external network 260, a packet that includes information identifying a path through core network 250 to permit ingress network device 210 to configure a header of the packet.

As further shown in FIG. 4, process 400 may include configuring a header of the packet to include a first set of identifiers that identifies the path and/or an ingress network device via which the packet was received (block 420). For example, ingress network device 210 may configure a header of the packet to include a first set of identifiers that identifies the path and/or an ingress network device via which the packet was received (e.g., a controller or a control plane, associated with ingress network device 210, may determine a first set of identifiers and a forwarding plane, associated with ingress network device 210, may configure the first set of identifiers after receiving the first set of identifiers from the controller or the control plane). In some implementations, ingress network device 210 may configure a header of the packet after determining a path via which the packet is intended to be provided, as described above.

In some implementations, a header may include a portion of a packet that precedes a payload of the packet and includes information related to the packet, such as information used to provide the packet to a destination. For example, a header may include a set of labels (e.g., a label stack), a set of type-length-value (TLV) elements, and/or the like that includes information related to the payload of the packet.

In some implementations, when configuring the first set of identifiers, ingress network device 210 may configure a first set of identifiers that identifies a path via which the packet is to be provided and ingress network device 210 (e.g., an ingress source of the packet into core network 250). For example, ingress network device 210 may configure a header of a packet with a binding SID that identifies a path and a segment identifier (SID) that identifies ingress network device 210. In some implementations, when configuring the header to include the first set of identifiers, ingress network device 210 may combine multiple identifiers to form a single identifier. For example, ingress network device 210 may combine a binding SID and a SID to form a single identifier. Conversely, in some implementations, ingress network device 210 may configure the header with multiple identifiers (e.g., separate binding SID and SID in the same label or in different labels of the header).

In some implementations, when configuring the header to include a first set of identifiers, ingress network device 210 may configure the first set of identifiers such that other devices that are to receive the packet can process the header to determine the first set of identifiers. For example, ingress network device 210 may configure the header based on a readable label depth capability (RLDC) of ingress network device 210, core network device 220, and/or egress network device 230. Continuing with the previous example, if an RLDC of ingress network device 210, core network device 220, and/or egress network device 230 is three labels, then ingress network device 210 may configure the first set of identifiers no lower than the third label from the top label of a stack of labels included in the header. In some implementations, ingress network device 210 may use information identifying an RLDC of ingress network device 210, core network device 220, and/or egress network device 230 to determine where in a header to configure the identifier (e.g., information included in a data structure that identifies each device to receive the packet and a corresponding RLDC for each packet, information received via use of interior gateway protocol (IGP), etc.).

In some implementations, ingress network device 210 may configure a header with information indicating that a first set of identifiers included in the header identifies the path and ingress network device 210. For example, ingress network device 210 may configure a header with an indicator label that indicates that the next set of labels identifies the path and ingress network device 210 (e.g., based on an RLDC of the other devices, similar to that described above). In some implementations, the indicator label may indicate the presence of the first set of identifiers and/or may indicate that the first set of identifiers is to be used to account for traffic and not for another purpose, such as traffic forwarding. In some implementations, the first set of identifiers may be popped, pushed, swapped, and/or the like in a data structure or label stack associated with a packet. This permits other devices that receive the packet to quickly and efficiently identify the first set of identifiers in the header.

In this way, ingress network device 210 may configure a header of the packet to include an identifier that identifies the path and ingress network device 210 via which the packet was received prior to configuring the header with other identifiers.

As further shown in FIG. 4, process 400 may include configuring the header of the packet to include a second set of identifiers that identifies a set of devices associated with the path (block 430). For example, ingress network device 210 may configure the header of the packet to include a second set of identifiers that identifies a set of devices associated with the path. In some implementations, the set of devices may include another ingress network device 210, one or more core network devices 220, one or more egress network devices 230, and/or one or more server devices 240.

In some implementations, when configuring the header to include a second set of identifiers that identifies a set of devices associated with the path, ingress network device 210 may configure the header with a second set of identifiers that identifies a set of portions of the path, a set of links associated with the path, a set of segments of the path, a set of portions of an LSP, and/or the like. For example, ingress network device 210 may configure the header to include a set of node identifiers associated with the path.

Continuing with the previous example, assume that ingress network device 210 is associated with SID 10 and core network device 220 is associated with SID 20. In this case, ingress network device 210 may configure the header to include the identifier 1020 (e.g., a combination of SID 10 and SID 20) to identify a link between ingress network device 210 and core network device 220 as a segment of a path for a packet via core network 250. In some implementations, when configuring the header, ingress network device 210 may configure a label included in the header. In this way, ingress network device 210 may configure a header of the packet with a second set of identifiers that facilitate exchange of the packet among devices associated with core network 250.

In this way, ingress network device 210 may configure the header of the packet to include a second set of identifiers that identifies a set of devices associated with the path in association with configuring the header with the first set of identifiers described above.

As further shown in FIG. 4, process 400 may include determining whether a counter associated with the first set of identifiers has been initialized (block 440). For example, ingress network device 210 may determine whether a counter associated with the first set of identifiers has been initialized (e.g., a forwarding plane of ingress network device 210 may determine whether a counter has been initialized). A counter may record a quantity of packets that a device (e.g., ingress network device 210, core network device 220, and/or egress network device 230) has received. In some implementations, a counter may be associated with a particular path (e.g., a particular LSP) and/or a particular ingress network device 210 (e.g., when multiple ingress network devices 210 are associated with a path).

In some implementations, ingress network device 210 may perform a comparison of the first set of identifiers and data identifying counters associated with paths and/or ingress network devices 210 to determine whether a counter associated with the first set of identifiers has been initialized. For example, ingress network device 210 may perform a comparison of information identifying a path and a particular ingress network device 210 via which the packet was received and information identifying counters associated with paths and/or ingress network devices 210 (e.g., using a data structure).

In some implementations, when ingress network device 210 determines that ingress network device 210 has not initialized a counter associated with the first set of identifiers, ingress network device 210 may modify a value of the counter, as described below with respect to block 450. Conversely, in some implementations, if ingress network device 210 determines that ingress network device 210 has not initialized a counter associated with the first set of identifiers, then ingress network device 210 may initialize a counter associated with the first set of identifiers (e.g., a controller or a forwarding plane associated with ingress network device 210 may initialize a counter). In some implementations, when ingress network device 210 initializes a counter, ingress network device 210 may create a record for the counter that identifies the first set of identifiers with which the counter is associated and a default value for the counter, such as 0 (e.g., using a data structure).

In some implementations, ingress network device 210 may initialize a counter on an ingress interface. For example, ingress network device 210 may initialize a counter on an ingress interface of ingress network device 210 and not on an egress interface. This increases scalability of the implementations described herein by reducing a quantity of counters that ingress network device 210 needs to initialize. In addition, this conserves memory resources of ingress network device 210 by reducing a quantity of information that ingress network device 210 has to store (e.g., by reducing a quantity of counters associated with ingress network device 210) and/or conserves processing resources of ingress network device 210 that would have otherwise been consumed initializing a counter on an egress interface.

In this way, ingress network device 210 may determine whether a counter associated with the first set of identifiers has been initialized prior to modifying a value of the counter, as described below.

As further shown in FIG. 4, process 400 may include modifying a value of the counter to account for the packet (block 450). For example, ingress network device 210 may modify a value of the counter to account for the packet (e.g., record an indication that the packet was received via a path and/or ingress network device 210 associated with the counter, and as identified by the first set of identifiers). As another example, ingress network device 210 may modify a value of the counter to record a metric associated with the packet (e.g., a quantity of packets received, a size of the packet received, a quantity of bits/bytes received, etc.). In some implementations, a forwarding plane of ingress network device 210 may modify a value of a counter.

In some implementations, when modifying a value of the counter, ingress network device 210 may modify the value by a particular amount. For example, ingress network device 210 may modify the value by a quantity of packets, a quantity of bits/bytes, a size of packets, etc. that ingress network device 210 received, to represent a total quantity of packets, a total quantity bits/bytes, a total size of packets, etc. received during a threshold amount of time, and/or the like.

In some implementations, ingress network device 210 may determine whether ingress network device 210 received a threshold quantity of packets in a threshold amount of time (e.g., based on a value of a counter and/or a timer). In some implementations, when ingress network device 210 receives a threshold quantity of packets in a threshold amount of time, ingress network device 210 may perform an action, as described in more detail below with respect to block 470.

Conversely, in some implementations, when ingress network device 210 does not receive a threshold quantity of packets in a threshold amount of time (e.g., based on a value of a counter and/or a timer), ingress network device 210 may reset a counter (and a corresponding timer) to a default value. Additionally, or alternatively, ingress network device 210 may delete a counter (e.g., thereby conserving memory resource of ingress network device 210) when ingress network device 210 does not iterate a value for a counter after a threshold amount of time.

In this way, ingress network device 210 may modify a value of the counter to account for the packet prior to providing the packet to another device, as described below.

As further shown in FIG. 4, process 400 may include providing the packet (or information regarding the packet) to another device (block 460). For example, ingress network device 210 may provide the packet (or information regarding the packet) to another ingress network device 210, core network device 220, egress network device 230, and/or server device 240.

In some implementations, ingress network device 210 may provide the packet using the second set of identifiers. For example, ingress network device 210 may identify a particular device to which to provide the packet, a segment of a path via which to provide the packet, a path via which to provide the packet, and/or the like (e.g., using a SID included in the second set of identifiers, a node identifier included in the second set of identifiers, a label associated with the packet, etc.) and may provide the packet after identifying the particular device to which to provide the packet.

In some implementations, when providing the packet, ingress network device 210 may provide the packet via a particular path and via a particular link between ingress network device 210 and the other device. For example, ingress network device 210 may provide the packet via a particular LSP, of multiple LSPs, associated with a link between ingress network device 210 and the other device.

In some implementations, when another device receives the packet from ingress network device 210, the other device may process the packet. In some implementations, when core network device 220 receives the packet, core network device 220 may process the header of the packet to determine the next device to receive the packet (e.g., another core network device 220, egress network device 230, and/or server device 240). Additionally, or alternatively, core network device 220 may modify a header of the packet, such as by removing an identifier, included in the second set of identifiers, after receiving the packet. For example, core network device 220 may remove a label that identifies core network device 220 as a device along the path for the packet (e.g., because this information is no longer needed in the header of the packet once core network device 220 receives the packet). This conserves network resources by reducing a size of the packet. In addition, this conserves processing resources of a device that receives the packet from core network device 220 by reducing a quantity of identifiers that the device has to process upon receiving the packet. Further, ingress network device 210, core network device 220, and/or egress network device 230 may initialize a counter for an ingress interface on which a packet is received (e.g., and not for an egress interface via which the packet is to be provided as in control plane traffic accounting), thereby reducing a quantity of counters that ingress network device 210, core network device 220, and/or egress network device 230 may initialize.

In some implementations, when egress network device 230 receives a packet, egress network device 230 may process a header of the packet in a manner similar to that described above with respect to core network device 220. Additionally, or alternatively, egress network device 230 may modify a header of the packet. For example, egress network device 230 may modify a header of the packet in a manner similar to that described above with respect to core network device 220. Additionally, or alternatively, and as another example, egress network device 230 may remove an indicator from the header that indicates the presence of the first set of identifiers. Additionally, or alternatively, and as another example, egress network device 230 may remove the first set of identifiers from a header of the packet (e.g., by removing a label from the header of the packet). This conserves network resources by reducing a size of the packet. In addition, this conserves processing resources of a device that receives the packet from core network device 220 by reducing a quantity of identifiers that the device has to process upon receiving the packet.

In some implementations, another device that receives the packet (e.g., core network device 220 and/or egress network device 230) may perform another type of action. For example, core network device 220 and/or egress network device 230 may perform an action similar to that described above with respect to blocks 440 and/or 450. Additionally, or alternatively, and as another example, core network device 220 and/or egress network device 230 may perform an action similar to that described below with respect to block 470. Additionally, or alternatively, and as another example, core network device 220 and/or egress network device 230 may provide the packet to another device in a manner similar to that described above with respect to ingress network device 210. For example, core network device 220 may provide the packet to another core network device 220 and/or egress network device 230. Additionally, or alternatively, and as another example, egress network device 230 may provide the packet to a device associated with external network 260.

In some implementations, server device 240 may receive the packet (or information regarding the packet) and may perform an action after receiving the packet (or the information regarding the packet). In some implementations, for example, server device 240 may provide a set of instructions to ingress network device 210, core network device 220, and/or egress network device 230 to use an alternative path. Additionally, or alternatively, and as another example, server device 240 may generate a report regarding the packet (or information regarding the packet) and may provide the report to another device (e.g., a network operator device). Additionally, or alternatively, and as another example, server device 240 may determine metrics related to the packet (or information regarding the packet) and may include information identifying the metrics in a report.

In this way, ingress network device 210 may provide the packet to another device in association with performing an action related to the packet, as described below.

As further shown in FIG. 4, process 400 may include performing an action related to the packet and/or based on the value of the counter (block 470). For example, ingress network device 210 may perform an action (e.g., a controller of ingress network device 210 may perform an action). In some implementations, ingress network device 210 may perform an action related to the packet and/or based on the value of the counter.

In some implementations, ingress network device 210 may provide information to another device. For example, ingress network device 210 may provide a value of the counter, information identifying a path via which the packet was provided, metadata related to the packet (e.g., a particular external network 260 from which the packet was received, a payload size of the packet, etc.), and/or the like to core network device 220, egress network device 230, and/or server device 240, such as to permit aggregation of the information, analytics using the information, and/or the like. Additionally, or alternatively, ingress network device 210 may receive similar information from other devices (e.g., core network device 220, egress network device 230, and/or server device 240) and may aggregate the information, such as to permit analytics on the information.

In some implementations, ingress network device 210 may generate a report. For example, ingress network device 210 may generate a report that includes information related to the packet and/or information identifying a value of a counter. In some implementations, when ingress network device 210 aggregates information from other devices, ingress network device 210 may generate a report that includes the information from the other devices.

In some implementations, ingress network device 210 may perform analytics related to the packet and/or a value of a counter. For example, ingress network device 210 may identify a particular path on a link, associated with multiple paths, that is causing a threshold amount of congestion on the link (e.g., based on a value of a counter satisfying a threshold, a value of a counter satisfying a threshold in a threshold amount of time, etc.). In some implementations, ingress network device 210 may perform an action related to managing traffic (e.g., based on a result of performing analytics). For example, ingress network device 210 may determine to provide another packet via another path based on congestion on an intended path for the other packet, may provide a set of instructions to another device to cause the other device to provide the packet and/or another packet via a path different than an intended path, and/or the like.

In some implementations, ingress network device 210 may boot up or power down another device (e.g., based on a result of performing the analytics). For example, ingress network device 210 may boot up an additional core network device 220, power down a particular egress network device 230, and/or the like, such as to reduce congestion on a link, a path, etc.

In some implementations, ingress network device 210 may send a message. For example, ingress network device 210 may send a message identifying information related to the packet, a value of a counter, a particular path causing congestion on a link (e.g., a source of congestion), and/or the like (e.g., when a value of a counter satisfies a threshold, a value of a counter satisfies a threshold in a threshold amount of time, etc.). In some implementations, ingress network device 210 may send the message to a client device (e.g., a desktop computer, a laptop computer, a mobile phone, a wearable device, etc.) associated with a network administrator, such as to facilitate reconfiguration of core network 250 to reduce congestion on a link, a path, etc.

In some implementations, ingress network device 210 may store information related to performing an action. For example, ingress network device 210 may store information related to a packet, a value of a counter, a result of performing analytics, and information identifying a corresponding action that ingress network device 210 performed. This permits ingress network device 210 to generate a log of actions performed, to identify past actions when a similar packet, a similar value (e.g., that differs by a threshold amount), or a similar result is identified (e.g., thereby reducing an amount of time needed to perform an action), and/or the like.

In this way, ingress network device 210 may perform an action related to the packet and/or based on the value of the counter.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations, described herein, provide a network device that is capable of configuring a header of a packet with a set of identifiers that identifies a path via which the packet is to be provided and an ingress network device that received the packet. In this way, the network device may configure a set of identifiers that permit another network device to determine a particular path, of multiple paths associated with a link between two network devices, via which a packet was received. This permits the network device or another network device to record packet transfer metrics for each path of a link, thereby facilitating improved traffic management, improved analytics, and/or the like. This improves communications between two network devices by facilitating reduction or elimination of network congestion on a particular path. Further, this conserves network resources, such as bandwidth, between two network devices by facilitating the offloading of traffic on a link between the two network devices to another link.

Although particular implementations were described with respect to ingress network device 210, core network device 220, egress network device 230, and/or server device 240, the implementations described herein apply equally to ingress network device 210, core network device 220, egress network device 230, and/or server device 240. In other words, ingress network device 210, core network device 220, egress network device 230, and/or server device 240 may be associated with any or all of the implementations described herein.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below ay directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more memories; and
one or more processors to:
receive a packet that includes information identifying a path through a network,
the packet being received from an external network, and
the first device being a point of ingress for the network;
configure a header of the packet to include a set of packet accounting identifiers that identifies the first device and the path, and to include, in the header of the packet, an indicator that indicates a presence of the set of packet accounting identifiers in the header of the packet and indicates that the set of packet accounting identifiers is to be used to account for traffic and not for traffic forwarding;
configure the header of the packet to include a set of packet forwarding identifiers, different from the set of packet accounting identifiers, that identifies a set of devices associated with the path and via which the packet is to be forwarded; and
provide the packet to a second device, of the set of devices associated with the path, via a link between the first device and the second device, to enable the second device to perform an action based on the set of packet accounting identifiers.

2. The first device of claim 1, where the one or more processors are further to:
receive another packet from the second device;
remove an identifier, of another set of packet forwarding identifiers included in another header of the other packet, after receiving the other packet; and
provide the other packet to a third device after removing the identifier.

3. The first device of claim 1, where the one or more processors, when configuring the header to include the set of packet accounting identifiers, are to:
configure the set of packet accounting identifiers in the header based on a readable label depth capability of the second device.

4. The first device of claim 1, where the one or more processors are further to:
determine whether a counter associated with the set of packet accounting identifiers has been initialized,
the counter to be used to record a metric associated with the packet; and
modify a value of the counter to record the metric associated with the packet.

5. The first device of claim 4, where the one or more processors, when performing the action, are to perform analytics based on at least one of:
the value of the counter,
other information related to the packet, or
information related to another packet received by the first device or the second device.

6. The first device of claim 1, where the one or more processors are further to:
configure the header of the packet to include one or more packet forwarding identifiers that identify one or more devices associated with the path,
the one or more devices including at least one of:
one or more ingress network devices,
one or more core network devices, or
one or more egress network devices.

7. The first device of claim 6, where the one or more processors are further to:
determine a readable label depth capability of the one or more ingress network devices, the one or more core network devices, or the one or more egress network devices; and
configure the header of the packet to include one or more packet forwarding identifiers that identify one or more devices associated with the path, based on the readable label depth capability of the one or more ingress network devices, the one or more core network devices, or the one or more egress network devices.

8. A non-transitory computer-readable medium storing instructions, the instructions comprising:
one or more instructions that, when executed by one or more processors of a first network device, cause the one or more processors to:
receive one or more packets that include information identifying one or more paths through a core network,
the one or more packets being received from an external network or a second network device, and
the first network device being associated with the core network;
configure one or more headers of the one or more packets to include one or more respective sets of packet accounting identifiers that identify the one or more paths and the first network device, and to include, in each of the one or more headers of the one or more packets, an indicator that indicates a presence of the respective set of packet accounting identifiers in the header of the packet and indicates that the respective set of packet accounting identifiers is to be used to account for traffic and not for traffic forwarding;
configure the one or more headers of the one or more packets to include one or more respective sets of packet forwarding identifiers, different from the respective sets of packet accounting identifiers, that identify one or more sets of devices associated with the one or more paths and via which the one or more packets are to be forwarded; and
provide the one or more packets to the one or more sets of devices associated with the one or more paths, via links between the first network device and the one or more sets of devices, to enable the one or more sets of devices to perform one or more actions based on the one or more sets of packet accounting identifiers.

9. The non-transitory computer-readable medium of claim 8, where the one or more sets of devices include at least one of:
one or more ingress network devices,
one or more core network devices, or
one or more egress network devices.

10. The non-transitory computer-readable medium of claim 9, where the one or more instructions, when executed by the one or more processors, further cause the one or more processors to:
  determine a readable label depth capability of the one or more ingress network devices, the one or more core network devices, or the one or more egress network devices; and
  where the one or more instructions, that cause the one or more processors to configure the one or more headers to include the one or more sets of packet accounting identifiers, cause the one or more processors to:
    configure the one or more headers based on the readable label depth capability of the one or more ingress network devices, the one or more core network devices, or the one or more egress network devices.

11. The non-transitory computer-readable medium of claim 9, where the one or more instructions, that cause the one or more processors to perform the one or more actions, cause the one or more processors to:
  provide the one or more packets to the one or more ingress network devices, the one or more core network devices, or the one or more egress network devices.

12. The non-transitory computer-readable medium of claim 8, where the one or more instructions, when executed by the one or more processors, further cause the one or more processors to:
  determine whether one or more counters associated with the one or more sets of packet accounting identifiers have been initialized,
    the one or more counters to be used to record one or more metrics associated with the one or more packets;
  modify one or more values of the one or more counters to record the one or more metrics associated with the one or more packets; and
  perform the one or more actions based on the one or more values of the one or more counters.

13. The non-transitory computer-readable medium of claim 12, where the one or more instructions, when executed by the one or more processors, further cause the one or more processors to:
  determine that the one or more counters have not been initialized; and
  initialize the one or more counters on one or more ingress interfaces associated with the first network device after determining that the one or more counters have not been initialized.

14. The non-transitory computer-readable medium of claim 12, where the one or more instructions, that cause the one or more processors to perform the one or more actions, cause the one or more processors to:
  perform traffic management based on the one or more values of the one or more counters related to the one or more packets.

15. A method, comprising:
  receiving, by a first device, a packet that includes information identifying a path through a first network,
    the packet originating from a second network;
  configuring, by the first device, a header of the packet to include a set of packet accounting identifiers that identifies the first device and the path, and to include, in the header of the packet, an indicator that indicates a presence of the set of packet accounting identifiers in the header of the packet and indicates that the set of packet accounting identifiers is to be used to account for traffic and not for traffic forwarding;
  configuring, by the first device, the header of the packet to include a set of packet forwarding identifiers, different from the set of packet accounting identifiers, that identifies a set of devices associated with the path and via which the packet is to be forwarded; and
  providing, by the first device, the packet to a second device, of the set of devices associated with the path, via a link between the first device and the second device, to enable the second device to perform an action based on the set of packet accounting identifiers.

16. The method of claim 15, further comprising:
  configuring the set of packet accounting identifiers in the header based on a readable label depth capability of the second device.

17. The method of claim 15, further comprising:
  receiving another packet from a third device;
  removing an identifier included in another set of packet forwarding identifiers included in another header of the other packet after receiving the other packet,
    the identifier identifying the first device; and
  modifying another value of a counter to record a metric associated with the other packet,
    the other counter being associated with another set of packet accounting identifiers included in the other header of the other packet.

18. The method of claim 15, further comprising:
  determining whether a counter associated with the set of packet accounting identifiers has been initialized, the counter to be used to record a metric relating to packets to be transmitted via the path; and
  modifying a value of the counter to record the metric.

19. The method of claim 15, further comprising:
  performing traffic management based on the set of packet accounting identifiers.

20. The method of claim 15, further comprising:
  aggregating information related to one or more packets received by the first device and the second device;
  analyzing the information related to the one or more packets received by the first device and the second device to identify a source of congestion on a link between the first device and the second device; and
  modifying an operation of the first device or the second device after identifying the source of congestion on the link.

* * * * *